US011859445B2

(12) United States Patent

Nicolosi et al.

(10) Patent No.: US 11,859,445 B2

(45) Date of Patent: Jan. 2, 2024

(54) INSULATED GLAZING UNITS

(71) Applicant: Pellini S.p.A., Codogno (IT)

(72) Inventors: Giovanni Nicolosi, Dresano (IT); Alessandro Pellini, Codogno (IT)

(73) Assignee: PELLINI S.p.A., Codogno (IT)

( * ) Notice: Subject to any disclaimer, the term of this patent is extended or adjusted under 35 U.S.C. 154(b) by 327 days.

(21) Appl. No.: 17/282,706

(22) PCT Filed: Oct. 10, 2019

(86) PCT No.: PCT/IB2019/058657

§ 371 (c)(1),
(2) Date: Apr. 2, 2021

(87) PCT Pub. No.: WO2020/075113

PCT Pub. Date: Apr. 16, 2020

(65) Prior Publication Data

US 2021/0388672 A1 Dec. 16, 2021

(30) Foreign Application Priority Data

Oct. 11, 2018 (IT) ........................ 102018000009369

(51) Int. Cl.
*E06B 9/264* (2006.01)

(52) U.S. Cl.
CPC ...... *E06B 9/264* (2013.01); *E06B 2009/2643* (2013.01)

(58) Field of Classification Search
CPC ............ E06B 9/264; E06B 2009/2643; E06B 3/6722
See application file for complete search history.

(56) References Cited

U.S. PATENT DOCUMENTS 4,459,778 A 7/1984 Ball
5,699,845 A * 12/1997 Jelic ........................ E06B 9/264 160/176.1 R (Continued)

FOREIGN PATENT DOCUMENTS

EP 1087095 A1 3/2001
EP 2733302 A2 5/2014

OTHER PUBLICATIONS

International Search Report and Written Opinion in corresponding International Application No. PCT/IB2019/058657 dated Dec. 9, 2019, 10 pages.

(Continued)

*Primary Examiner* — Beth A Stephan

(74) *Attorney, Agent, or Firm* — MH2 TECHNOLOGY LAW GROUP LLP

(57) ABSTRACT

An insulated glazing unit may include: a frame including a base, a cross member above the base, and two upright members for connection between the cross member and base; at least two at least partially transparent panes applied to the frame, wherein the at least two partially transparent panes and frame define a closed volume; a light ray shielding device within the closed volume; support means mechanically connected to the cross member and operably associated with the shielding device; wherein the shielding device includes slats and a bottom member, wherein the slats are connected to each other and the bottom member, wherein the shielding device is configured to alternate between a raised position, in which the slats and bottom member are compacted, and a deployed position, in which the bottom member is proximate to the base; stationary guide means at the base; and moving guide means on the bottom member.

10 Claims, 8 Drawing Sheets

(56) References Cited

U.S. PATENT DOCUMENTS

| | | | | |
|---|---|---|---|---|
| 6,957,680 | B2 * | 10/2005 | Anderson | E06B 9/264 160/171 |
| 9,140,059 | B2 * | 9/2015 | Kirk | E06B 9/264 |
| 9,512,672 | B2 * | 12/2016 | Colson | E06B 9/262 |
| 2004/0011476 | A1 * | 1/2004 | Schroder | E06B 9/32 160/107 |
| 2006/0169418 | A1 * | 8/2006 | Gromotka | E06B 9/32 160/107 |
| 2008/0029226 | A1 * | 2/2008 | Huang | E06B 9/264 160/107 |
| 2014/0020851 | A1 * | 1/2014 | Ouzts | E06B 9/264 160/127 |
| 2018/0355661 | A1 * | 12/2018 | Hummel | E06B 9/307 |
| 2021/0367553 | A1 * | 11/2021 | Roldan Molinero | E06B 9/264 |

OTHER PUBLICATIONS

Italian Search Report and Written Opinion in corresponding Italian Application No. 102018000009369 dated Jun. 24, 2019, 7 pages.

* cited by examiner

INSULATED GLAZING UNITS

CROSS-REFERENCE TO RELATED APPLICATION(S)

This application is a national stage entry from International Application No. PCT/IB2019/058657, filed on Oct. 10, 2019, in the Receiving Office ("RO/IB") of the International Bureau of the World Intellectual Property Organization ("WIPO"), and published as International Publication No. WO 2020/075113 A1 on Apr. 16, 2020; International Application No. PCT/IB2019/058657 claims priority from Italian Patent Application No. 102018000009369, filed on Oct. 11, 2018, in the Italian Patent and Trademark Office ("IPTO"), the entire contents of all of which are incorporated herein by reference.

FIELD OF THE INVENTION

The present invention relates to an improved insulated glazing unit as defined in the preamble of claim 1.

BACKGROUND ART

A double-glazing unit is known to find application in windows of dwellings or, more generally, windows of buildings to ensure thermal insulation of the indoor environment from the outdoor environment.

Insulated glazing units are known in the art, which comprise a frame and two or more panes of glass that are hermetically fixed to the frame to define a closed volume.

Such closed volume may conventionally accommodate a tent, e.g. Venetian or pleated blind. In the particular case of a Venetian blind, the blind comprises a plurality of slats interposed between a bottom member and a top member of the frame. The plurality of slats, the bottom member and the top member are connected to one another by means of at least one set of cords and ladders that can move the slats both vertically and about an axis of symmetry of the slats.

In the prior art, the blind is attached to the cross member of the frame, and the bottom member is configured to reversibly slide from the top member to the base of the frame.

In particular, the Venetian blind is configured to alternate between a raised position and a lowered position and a number of intermediate positions.

In the raised position the bottom member and the plurality of slats are compacted together at the cross member, thereby allowing the passage of light through the panes of glass.

On the other hand, in the lowered position, the bottom member is located at the base. In the lowered position, the plurality of slats is arranged substantially along the entire space between the top member and the bottom member of the frame.

In each of the intermediate positions and in the lowered position, the slats may assume various configurations between two extremes, which include an open configuration and a screening configuration.

In the open configuration, the slats assume a position that is substantially perpendicular to the panes of glass. In this open configuration, light may pass between the slats.

Conversely, in the screening configuration, the slats are oriented substantially parallel to the panes of glass in partially overlapping relationship. Hence, the slats are arranged to block the passage of the light in the space between the top member and the bottom member.

PROBLEM OF THE PRIOR ART

One drawback of this arrangement is that, in the lowered position and in the screening configuration, the bottom member of the blind does not ensure complete blocking of light perfect proximate to the base.

More in detail, in the lowered position the bottom member rests on the base. Thus, when the bottom member rests on the base, the cords of the blind are loosened, as they are no longer tensioned by the weight of the bottom member. As a result, the slats are not properly arranged.

More in detail, the slats in the proximity of the bottom member are not uniformly arranged within the insulated glazing unit and are no longer in overlapping relationship. In other words, the slats in the proximity of the bottom member are spaced apart. Therefore, light can pass between the slats proximate to the bottom member.

Furthermore, in the lowered position the ladders may be interposed between the slats. Therefore, the ladders do not allow proper overlapping of the slats. Therefore, light can pass between the slats.

OBJECT OF THE INVENTION

Therefore, the technical purpose of the present invention is to provide an insulated glazing unit that can obviate the aforementioned prior art drawbacks.

In particular, the object of the present invention is to provide an insulated glazing unit that allows proper positioning of the slats proximate to the base of the insulating glazing unit in the screening configuration.

SUMMARY OF THE INVENTION

The aforementioned technical purpose and objects are substantially fulfilled by an insulated glazing unit that comprises the technical features as disclosed in one or more of the accompanying claims.

With the present invention, the insulated glazing unit solves the technical problem, by causing the bottom member to tilt as soon as the bottom member comes proximate to the base of the frame.

Advantageously, the tilt of the bottom member of the blind accordingly causes the slats to rotate proximate to the bottom member. As a result, the slats are arranged with no gaps or spaces between the slats, thereby preventing the passage of light, and ensuring proper screening by the blind.

In addition, the tilting movement of the bottom member is independent of the length of the ladders, which affords greater freedom in setting ladder length.

BRIEF DESCRIPTION OF FIGURES

Further features and advantages of the present invention will result more clearly from the illustrative, non-limiting description of a preferred, non-exclusive embodiment of an insulated glazing unit as shown in the annexed drawings, in which.

DETAILED DESCRIPTION

The apparatus of the annexed figures shall be deemed to be schematically illustrated, not necessarily drawn to scale, and not necessarily representing the actual proportions of its parts.

Although this is not expressly shown, the individual features described with reference to each embodiment shall be intended as auxiliary and/or interchangeable with other features, as described with reference to other embodiments.

Referring to the accompanying figures, numeral 1 designates an insulating glazing unit designed for use in windows of buildings, to ensure thermal insulation of the indoor environment from the outdoor environment.

Figure 1:
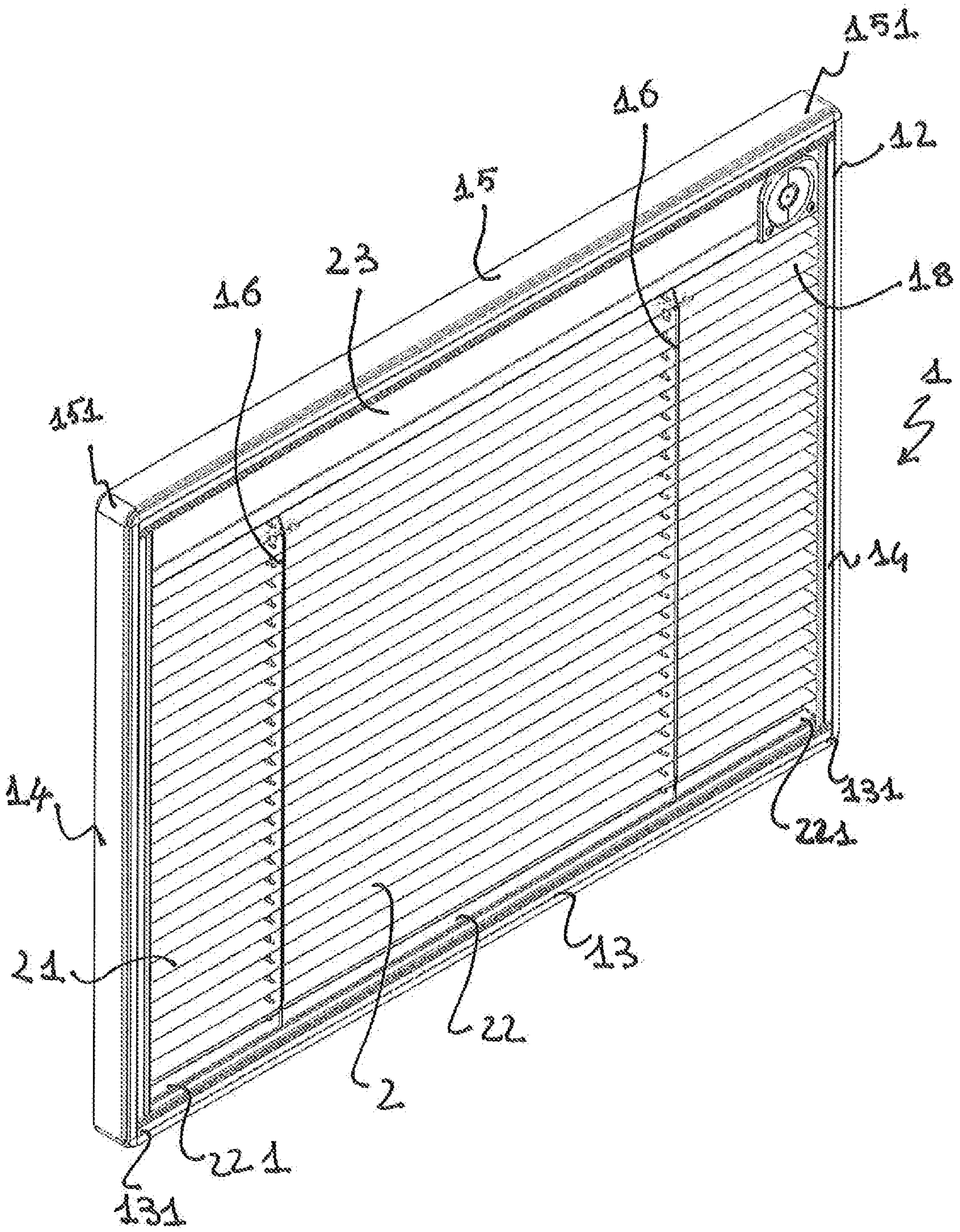
FIG. 1 is a perspective view of an insulated glazing unit of the present invention.

Particularly referring to FIG. 1, the insulated glazing unit 1 comprises a frame 12. This frame 12 comprises a base 13, a cross member 15 placed above the base 13 and two upright members 14 for connection between the cross member 15 and the base 13.

More in detail, the base 13 has two opposite ends 131. The two upright members 14 are connected to the base 13 at the ends 131 of the base 13. In other words, each upright member 14 is connected to one respective end 131 of the base 13.

Likewise, the cross member 15 has two opposite ends 151. Each of the two ends 151 of the cross member 15 is located above one respective end 131 of the base 13. The two upright members 14 are connected to the cross member 15 at the ends 151 of the cross member 15. In other words, each upright member 14 is connected to one respective end 151 of the cross member 15.

Preferably, the base 13 and the cross member 15 are parallel and opposite to each other. As a result, the two upright members 14 for connection of the base 13 and the cross member 15 are also parallel and opposite to each other.

The insulated glazing unit 1 comprises at least two at least partially transparent panes, which are applied to the frame 12.

The at least two panes are in mutually facing and parallel relationship.

The at least two panes are preferably made of glass and are completely transparent.

While two panes of glass are used in one embodiment, three or four panes of glass may be also provided.

The at least two panes are applied to the frame 12 in air-tight fashion, for instance to contain gas, thereby defining a hermetically sealed inner volume 18.

The insulated glazing unit 1 comprises a light ray shielding device 2 placed in the volume 18 as well as drive means to drive the light ray shielding device up and/or down.

In particular, the light ray shielding device 2 comprises a plurality of slats 21 and a bottom member 22. The slats are connected to each other and to the bottom member 22. In a preferred embodiment of the present invention, the light ray shielding device 2 is embodied by a venetian blind.

For the purposes hereof, it should be noted, also with reference to FIG. 1, that the drive means comprise support means attached to the cross member 15, such as a box 23.

The box 23 receives, as is known per se, a shaft which is coupled to an electric motor and its electronics to cause movement of the light ray shielding device 2 (not shown).

In particular, the shaft in the box 23 is connected to the slats 21 and the bottom member 22 by means of cords and ladders, also in a well-known manner, that will not be disclosed herein.

In one aspect, the plurality of slats 21, the bottom member 22 and the box 23 extend between the two upright members 14 of the frame 12.

In one aspect the bottom member 22 of the light ray shielding device 2 has two opposite ends 221. In particular, such ends 221 are placed proximate to the upright members 14 of the frame 12.

It shall be noted that the light ray shielding device 2 is adapted to alternate between a raised position and a deployed position.

In the raised position the slats 21 and the bottom member 22 are compacted together. In other words, in the raised position the slats 21 and the bottom member 22 are compacted together at the box 23 applied to the cross member 15.

In the deployed position the bottom member 22 is placed proximate to the base 13 of the insulated glazing unit 1. In particular, in the deployed position the bottom member 22 is spaced apart from the box 23, whereas the slats 21 span the space between the bottom member 22 and the box 23.

In other words, in the deployed position the slats 21 span substantially the entire space between the cross member 15 and the base 13 of the frame 12. It shall be noted that the aforementioned drive means are adapted to alternate the light ray shielding device 2 between the raised position and the deployed position.

It shall be noted that the light ray shielding device 2 may assume a series of intermediate positions between the raised position and the deployed position. In the intermediate positions, the bottom member 22 is located in an intermediate position between the base 13 and the box 23. In other words, the bottom member 22 is spaced apart from both the base 13 and the box 23. Furthermore, some of the slats 21 are compacted at the box 23, whereas the rest of the slats 23 span the space between the bottom member 22 and the box 23.

In the deployed position and in the intermediate positions the slats 21 may alternate between an open configuration and a screening configuration.

In the open configuration, the slats 21 are substantially perpendicular to the panes. In addition, the slats are spaced apart from each other and in this configuration, light is allowed to pass between the slats 21.

In the screening configuration the slats are in a partially overlapping relationship.

The partial overlapping relationship of the slats 21 blocks the passage of light in the space between the bottom member 22 and the box 23 of the light ray shielding device.

The bottom member 22 of the light ray shielding device 2 is configured to alternate between a first configuration and a second configuration.

Figure 3A:
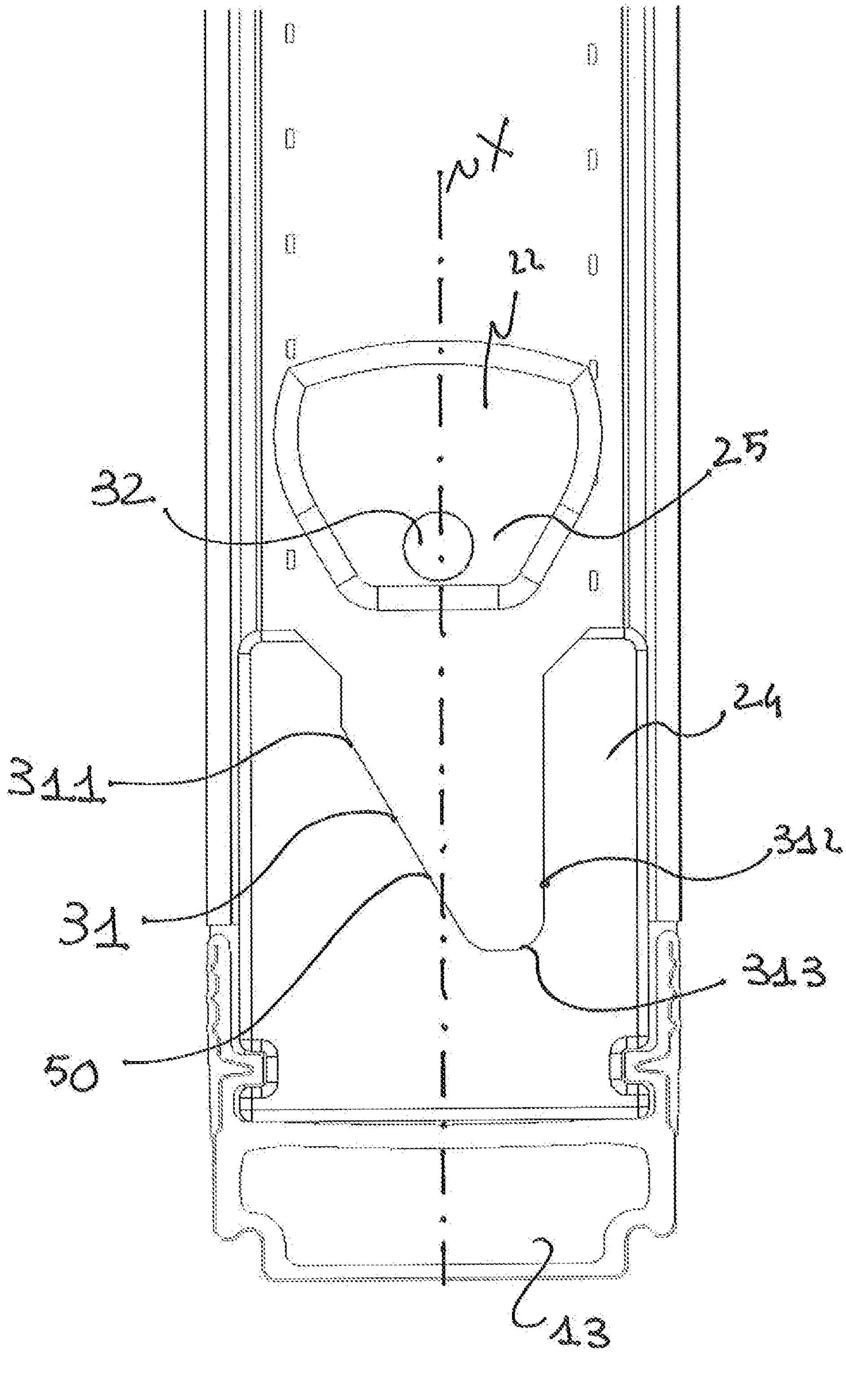
FIG. 3*a* is a sectional side view of a detail of a bottom side detail of the insulated glazing unit of FIG. 1, in a first operating configuration.
Figure 3B:
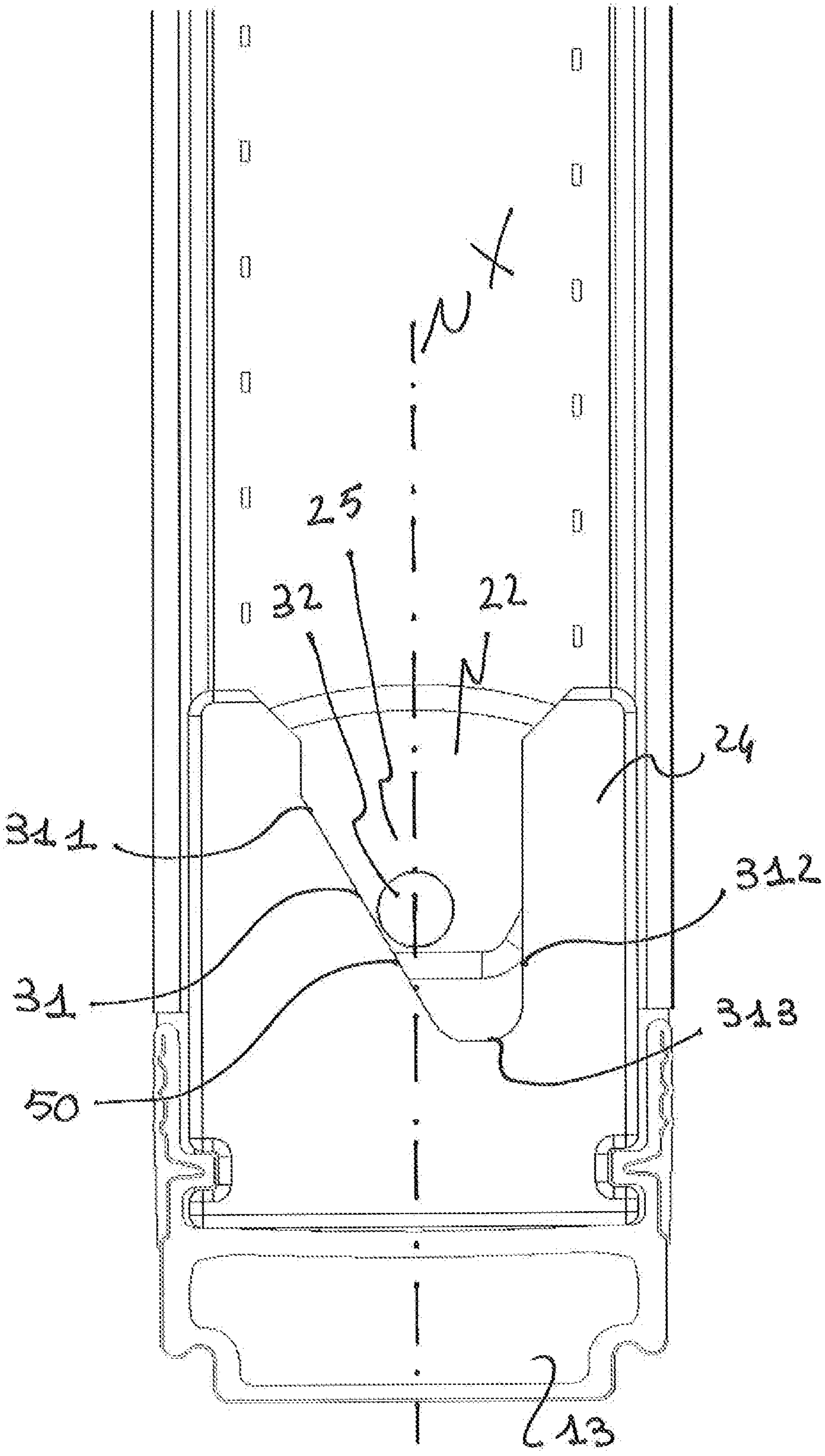
FIG. 3*b* is a sectional side view of a detail of a detail of the insulated glazing unit of FIG. 1, in a second operating configuration.
Figure 3C:
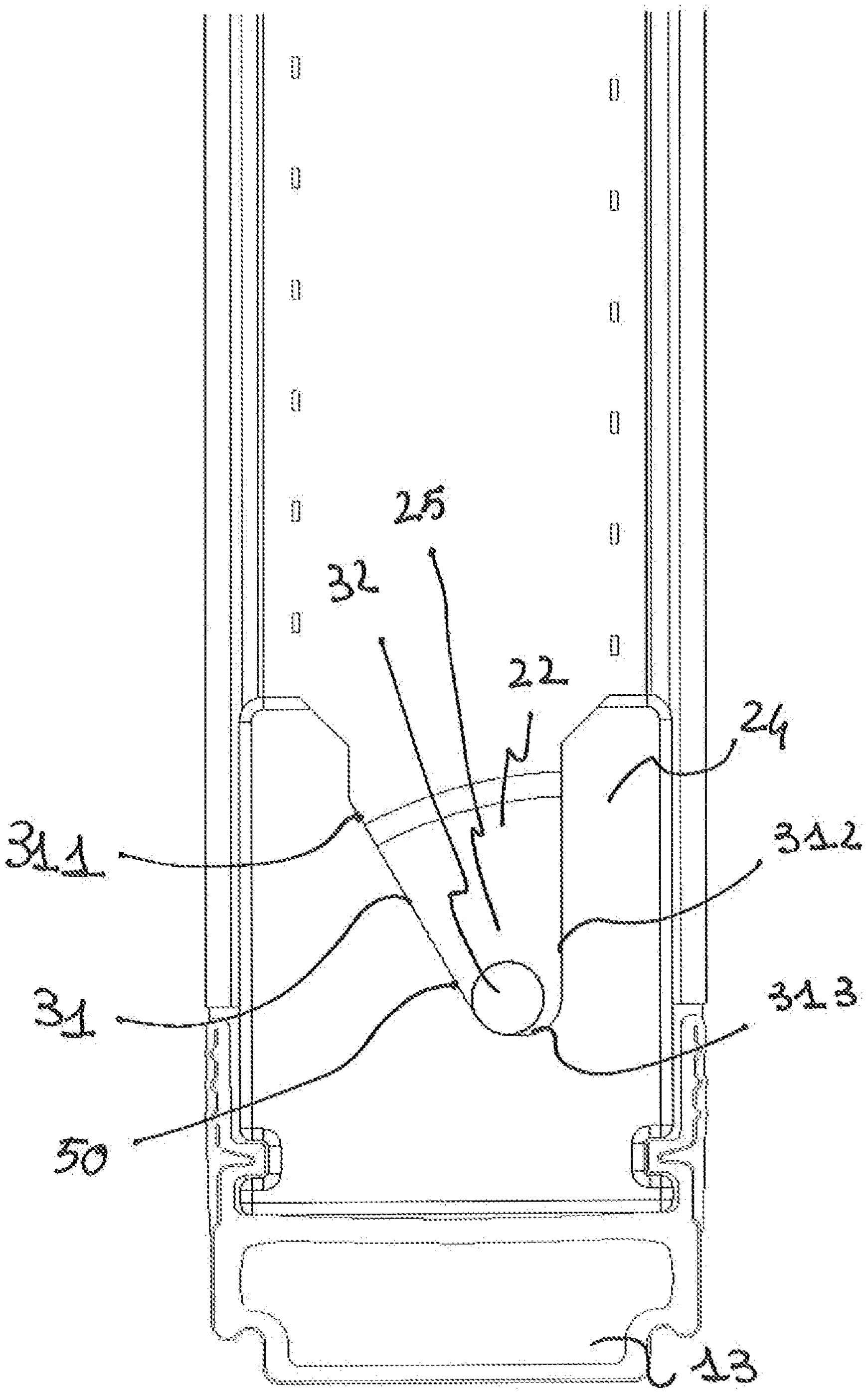
FIG. 3*c* is a sectional side view of a detail of a detail of the insulated glazing unit of FIG. 1, in a third operating configuration.

Particularly referring to FIG. 3*a*, in the first configuration, the bottom member 22 can slide toward/away from the base 13 thereby defining a slide direction X.

Figure 3D:
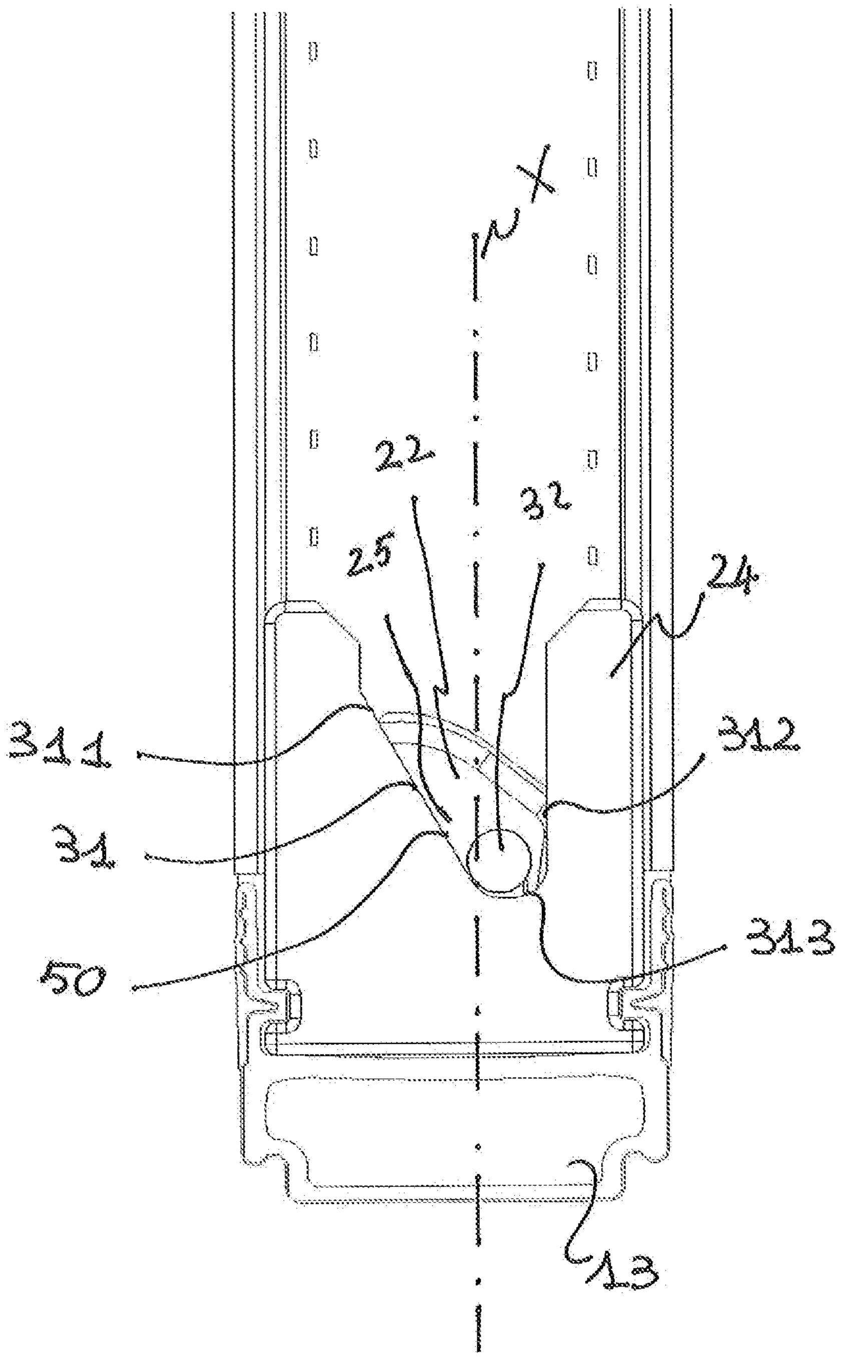
FIG. 3*d* is a sectional side view of a detail of a detail of the insulated glazing unit of FIG. 1, in a fourth operating configuration.

Particularly referring to FIG. 3*d*, in the second configuration the bottom member 22 is proximate to the base 13 and is tilted with respect to the slide direction X.

It shall be noted that, in the first configuration, the bottom member 22 can reversibly slide from the box 23 toward the base 13 of the frame 12, in particular to alternate the light ray shielding device 2 from the raised position to the deployed position.

Preferably, as the bottom member 22 slides, the slats 21 connected thereto are deployed.

In the second configuration, the bottom member 22 is tilted with respect to the slide direction X by a predetermined angle. In other words, the bottom member 22 is rotated about an axis Y (FIG. 4) of the bottom member 22 perpendicular to the slide direction X.

Figure 2:
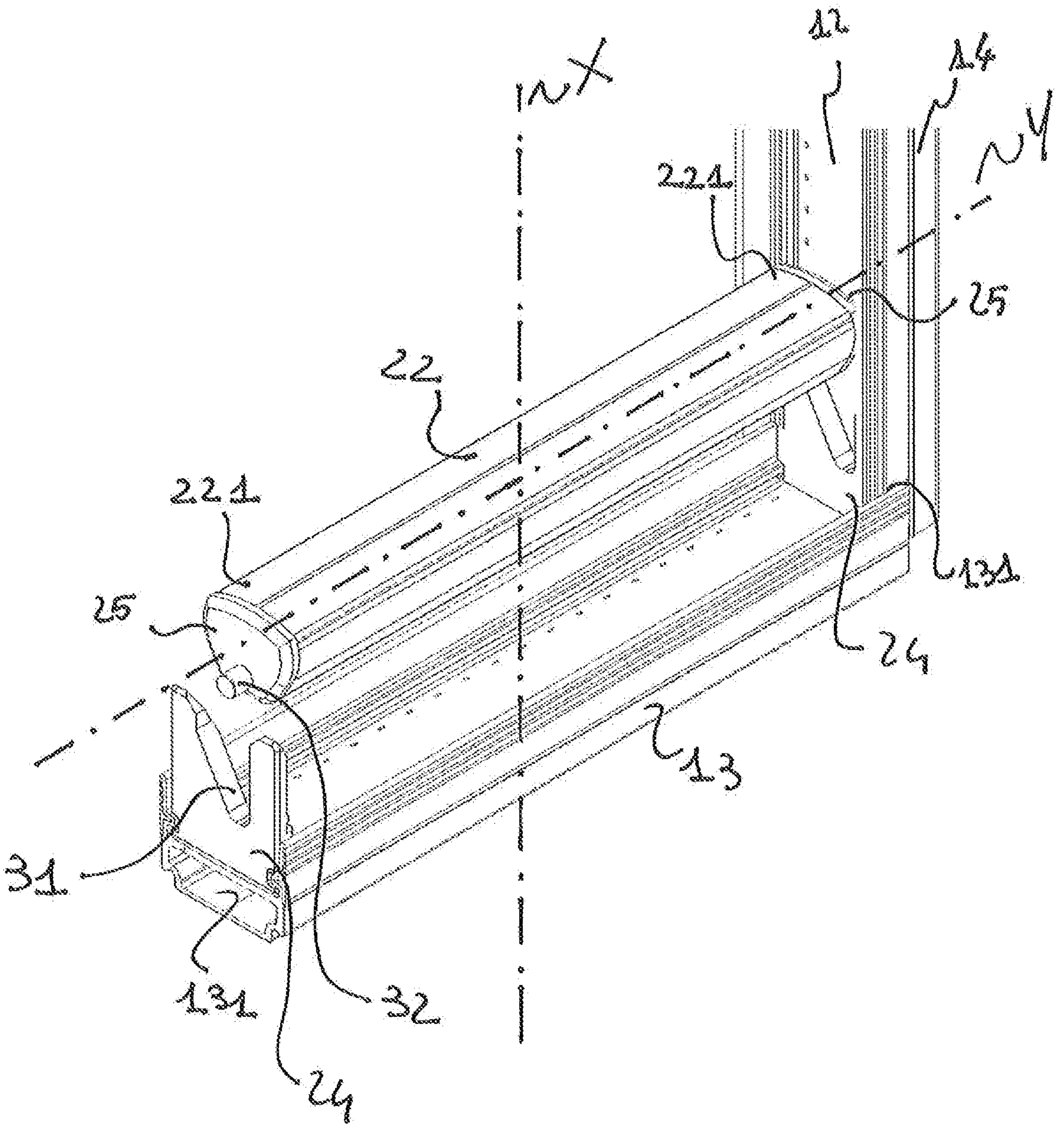
FIG. 2 is a perspective view of a bottom side detail of the insulated glazing unit of FIG. 1.
Figure 4:
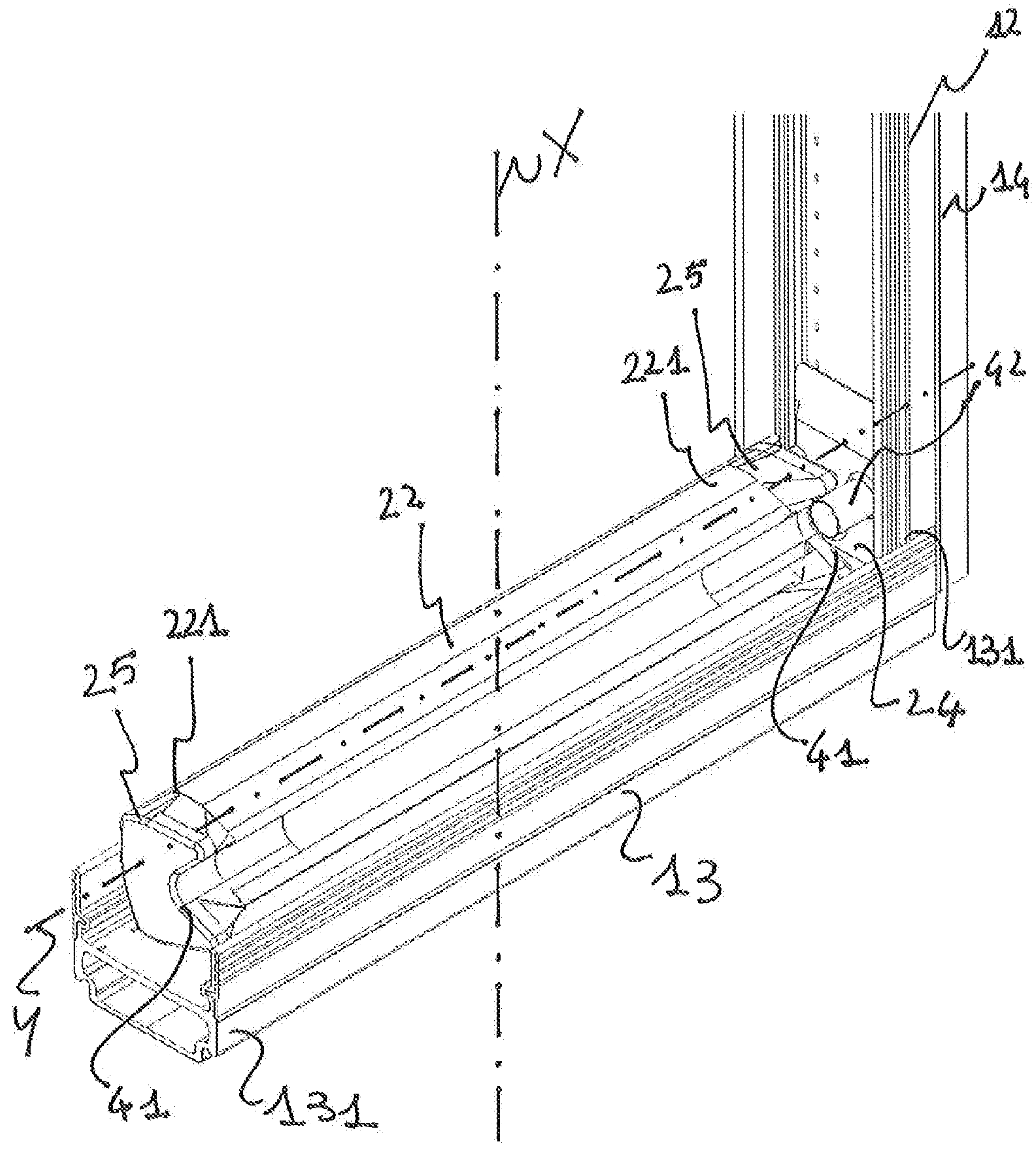
FIG. 4 is a perspective view of a detail of an insulated glazing unit of the present invention according to a second embodiment.

Advantageously, as shown in FIGS. 2 and 4, the tilt of the bottom member 22 with respect to the slide direction X causes the slats 21 to partially overlap proximate to the bottom member 22 in the screening configuration of the slats 21. The partial overlapping relationship of the slats 21 blocks the passage of light.

The insulated glazing unit 1 further comprises first stationary guide means 24 located at the base 13 of the insulated glazing unit 1 (FIGS. 2 and 4). More in detail, the first guide means 24 are configured to be located at least at one end 131 of the base 13 of the insulated glazing unit 1.

More in detail, the first guide means 24 are fixed to the upright members 14 of the frame 12. In particular, the first guide means 24 are fixed to the upright members 14 at the end 131 of the base 13.

The insulated glazing unit 1 further comprises second moving guide means 25 located on the bottom member 22 of said light ray shielding device 2. More in detail, the second guide means 25 are located at least at one of the ends 221 of the bottom member 22.

The first 24 and the second guide means 25 are configured to contact each other when the light ray shielding device 2 is in the deployed position and to alternate the bottom member 22 from the first configuration to the second configuration.

In other words, the mutual sliding movement between the first 24 and the second guide means 25 causes the bottom member 22 to alternate from the first configuration to the second configuration, thereby allowing the bottom member to rotate about an axis of symmetry.

In a first embodiment as shown in FIGS. 2, 3*a*, 3*b*, 3*c* and 3*d*, the first guide means 24 comprise at least one recess 31 and the second guide means 25 comprise at least one pin 32 fixed to the bottom member 22. The pin 32 is configured to move relative to the base 13 of the insulated glazing unit 1 and to slide in the recess 31.

In other words, the recess 31 remains stationary, whereas the pin 32 slides in the recess 31. More in detail, the pin 32 is fixed at one of the ends 221 of the bottom member 22. Further in detail, the pin 32 is placed below the center of gravity of the bottom member 22. Preferably, the pin 32 is placed at a plane of symmetry of one end 221 of the bottom member 22 at a predetermined distance from the center of gravity of the bottom member 22.

Particularly referring to the recess 31 of FIGS. 2 and 3*a*, this recess 31 has a profile 50 with a first section 311 tilted with respect to the slide direction X of the bottom member 22. This first section 311 is configured to contact the pin 32 when the light ray shielding device 2 is in the deployed condition and to guide the sliding movement of such pin 32 in the recess 31. In other words, the first section 311 is below the pin 32 during the sliding movement of the blind 2.

An insulated glazing unit as claimed in claim 7, wherein the profile 50 of the recess 31 has a second section 312 substantially parallel to the slide direction X of the bottom member 22 and configured to lock the bottom member 22 in the second configuration. In other words, the first section 311 and the second section 312 are tilted relative to each other.

More in detail, a connecting section 313 connects the first portion 311 and the second portion 312 of the profile. The connecting section 313 is substantially horizontal. The second section 312 prevents the pin 32 from sliding past the connecting section 313. Therefore, this pin 32 is locked at the connecting section 313.

In the embodiment of FIGS. 2-3*d*, the sliding movement of the pin 32 along the first section 311 of the profile 50 of the recess 31 causes the bottom member 22 to tilt.

In the embodiment of FIGS. 2, 3*a*, 3*b*, 3*c* and 3*d*, the first guide means 24 preferably comprise a pair of pins 32 and the second guide means comprise a pair of recesses 31. Each pin 32 is located at one respective end 221 of the bottom member 22, whereas each recess 31 is located at one respective end 131 of the base 13. Therefore, each pin 32 is configured to slide in the corresponding recess 31.

Figure 5:
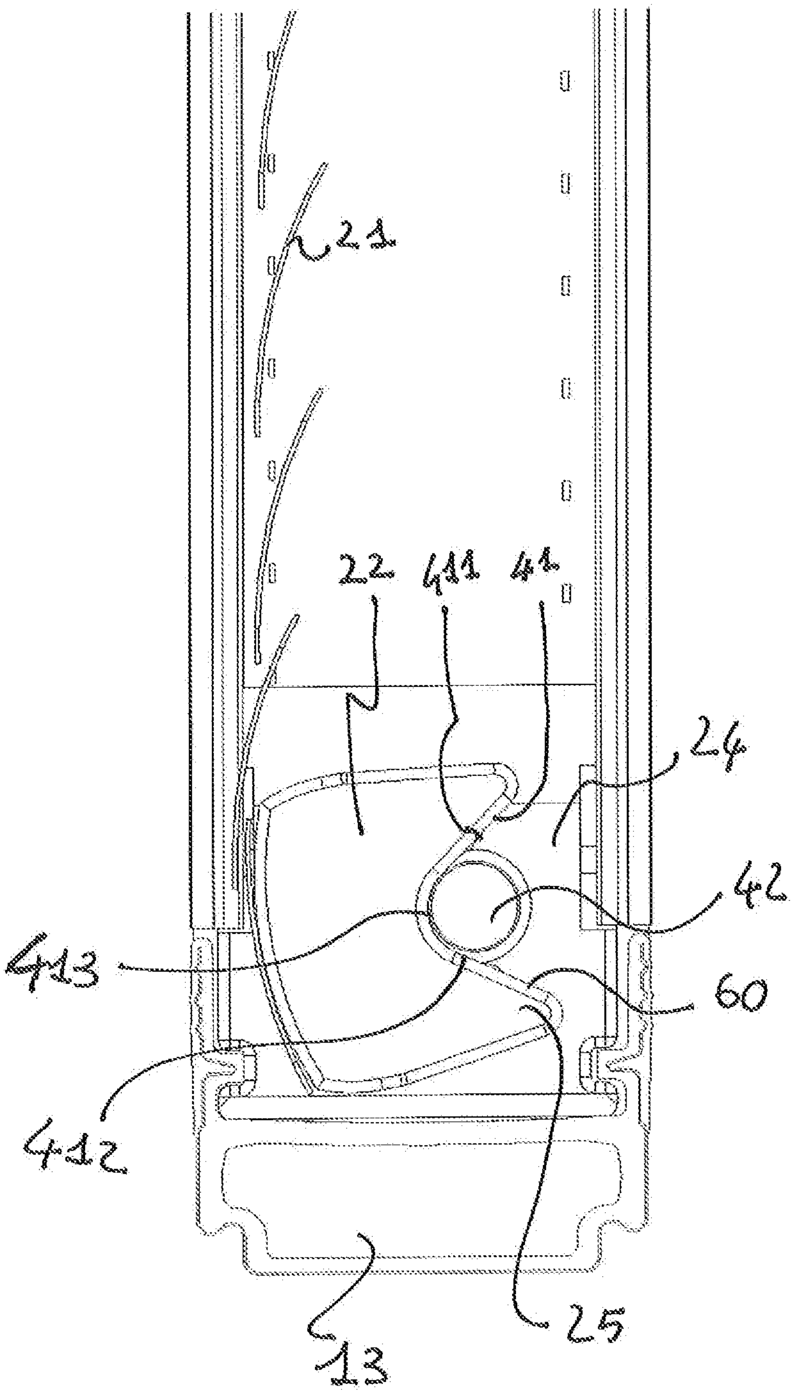
FIG. 5 is a sectional side view of a detail of the insulated glazing unit of FIG. 4.

In a second embodiment as shown for example in FIGS. 4 and 5, the first guide means 24 comprise at least one pin 42 and the second guide means 25 comprise at least one recess 41. The recess 41 is configured to move relative to the base 13 of the insulated glazing unit 1 and to slide around the pin 42.

In other words, the pin 42 remains stationary and the recess 41 slides around the pin 42. More in detail, the pin 42 is located at a predetermined distance from the plane of symmetry of one end 131 of the base 13.

Particularly referring to the recess 41 as shown in FIGS. 4 and 5, it will be appreciated that it has a profile 60 with a first section 411 tilted with respect to the slide direction X of the bottom member 22. This first section 411 is configured to contact the pin 42 when the light ray shielding device 2 is in the deployed condition and to guide the sliding movement of the pin 42 in the recess 41.

Furthermore, the profile 41 has a second section 412 that is tilted to the slide direction X and is symmetric to the first section 411 of the bottom member 22 and a connecting section 413 between the first section 411 and the second section 412.

In the embodiment of FIGS. 4 and 5, the sliding movement of the first section 411 of the recess 41 around the pin 42 causes the bottom member 22 to tilt.

The contact between the second section 412 and the pin 42 locks the bottom member 22 in the second configuration. Therefore, in the second configuration of the bottom member 22, the pin 42 contacts the connecting section 413 and the second section 412.

Preferably, in the embodiment of FIGS. 4 and 5, the first guide means 24 comprise a pair of recesses 41 and the second guide means comprise a pair of pins 42.

Each recess 41 is located at one respective end 221 of the bottom member 22, whereas each pin 42 is located at one respective end 131 of the base 13. Therefore, each recess 41 is configured to slide around its respective pin 42.

Those skilled in the art will obviously appreciate that a number of changes and variants as described above may be made to fulfill particular requirements, without departure from the scope of the invention, as defined in the following claims.

The invention claimed is:

1. An insulated glazing unit, comprising:

a frame comprising a base, a cross member above the base, and two upright members for connection between the cross member and the base;

at least two at least partially transparent panes that are applied to the frame, wherein the at least two at least partially transparent panes and the frame define a closed volume;

a light ray shielding device within the closed volume;

support means mechanically connected to the cross member and operably associated with the light ray shielding device in supporting relationship thereto;

wherein the light ray shielding device comprises a plurality of slats and a bottom member, wherein the slats are connected to each other and to the bottom member, wherein the light ray shielding device is configured to alternate between a raised position, in which the slats and the bottom member are compacted together, and a deployed position, in which the bottom member is proximate to the base;

first stationary guide means at the base of the frame; and second moving guide means on the bottom member of the light ray shielding device;

wherein the bottom member is configured to alternate between a first configuration, in which the bottom member is able to slide toward/away from the base thereby defining a slide direction, and a second configuration, in which the bottom member is proximate to the base and is tilted to the slide direction, and wherein the first stationary guide means and the second moving guide means are configured to contact each other when the light ray shielding device is in the deployed position and to alternate the bottom member from the first configuration to the second configuration.

2. The insulated glazing unit of claim 1, wherein the bottom member of the light ray shielding device has two opposite ends, and wherein the second moving guide means is at at least one of the two opposite ends.

3. The insulated glazing unit of claim 1, wherein the first stationary guide means is at at least one end of the base of the insulated glazing unit.

4. The insulated glazing unit of claim 1, wherein the first stationary guide means comprises a recess, wherein the second moving guide means comprises a pin fixed to the bottom member, and wherein the pin is configured to move relative to the base of the insulated glazing unit and to slide in the recess.

5. The insulated glazing unit of claim 4, wherein the pin is below a center of gravity of the bottom member.

6. The insulated glazing unit of claim 1, wherein the first stationary guide means comprises a pin, wherein the second moving guide means comprises a recess, and wherein the recess is configured to move relative to the base of the insulated glazing unit and to slide around the pin.

7. The insulated glazing unit of claim 4, wherein the recess has a profile having a first section tilted to the slide direction of the bottom member, and wherein the first section is configured to contact the pin when the light ray shielding device is in the deployed position and to guide sliding movement of the pin in the recess.

8. The insulated glazing unit of claim 7, wherein the profile of the recess has a second section substantially parallel to the slide direction of the bottom member and configured to lock the bottom member in the second configuration.

9. The insulated glazing unit of claim 6, wherein the recess has a profile having a first section tilted with respect to the slide direction of the bottom member, a second section tilted to the slide direction and symmetric to a first section of the bottom member, and a connecting section between the first section and the second section.

10. The insulated glazing unit of claim 1, wherein the first stationary guide means is fixed to the upright members.

* * * * *